May 18, 1965  A. N. SWEENY  3,183,634
FIXTURE FOR GRINDING SPADE DRILLS OR THE LIKE
Filed May 9, 1963  5 Sheets-Sheet 1
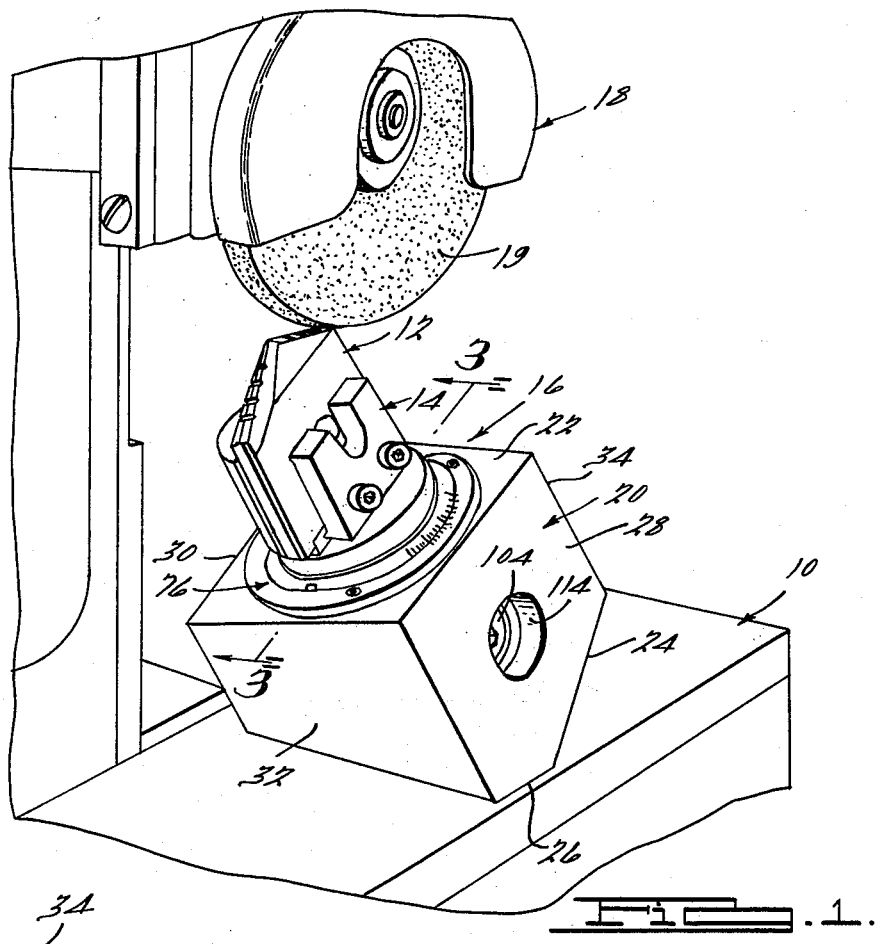
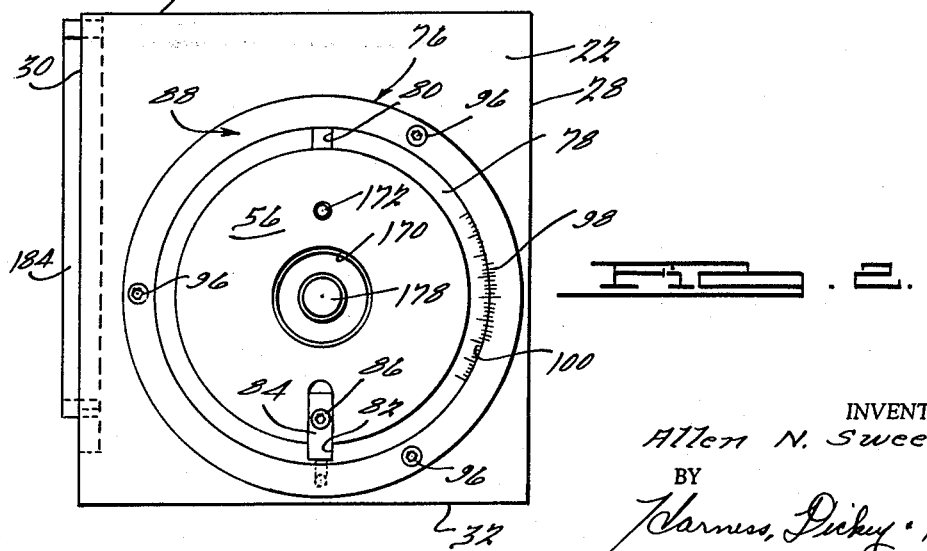
INVENTOR.
Allen N. Sweeny.
BY
Harness, Dickey & Pierce
ATTORNEYS

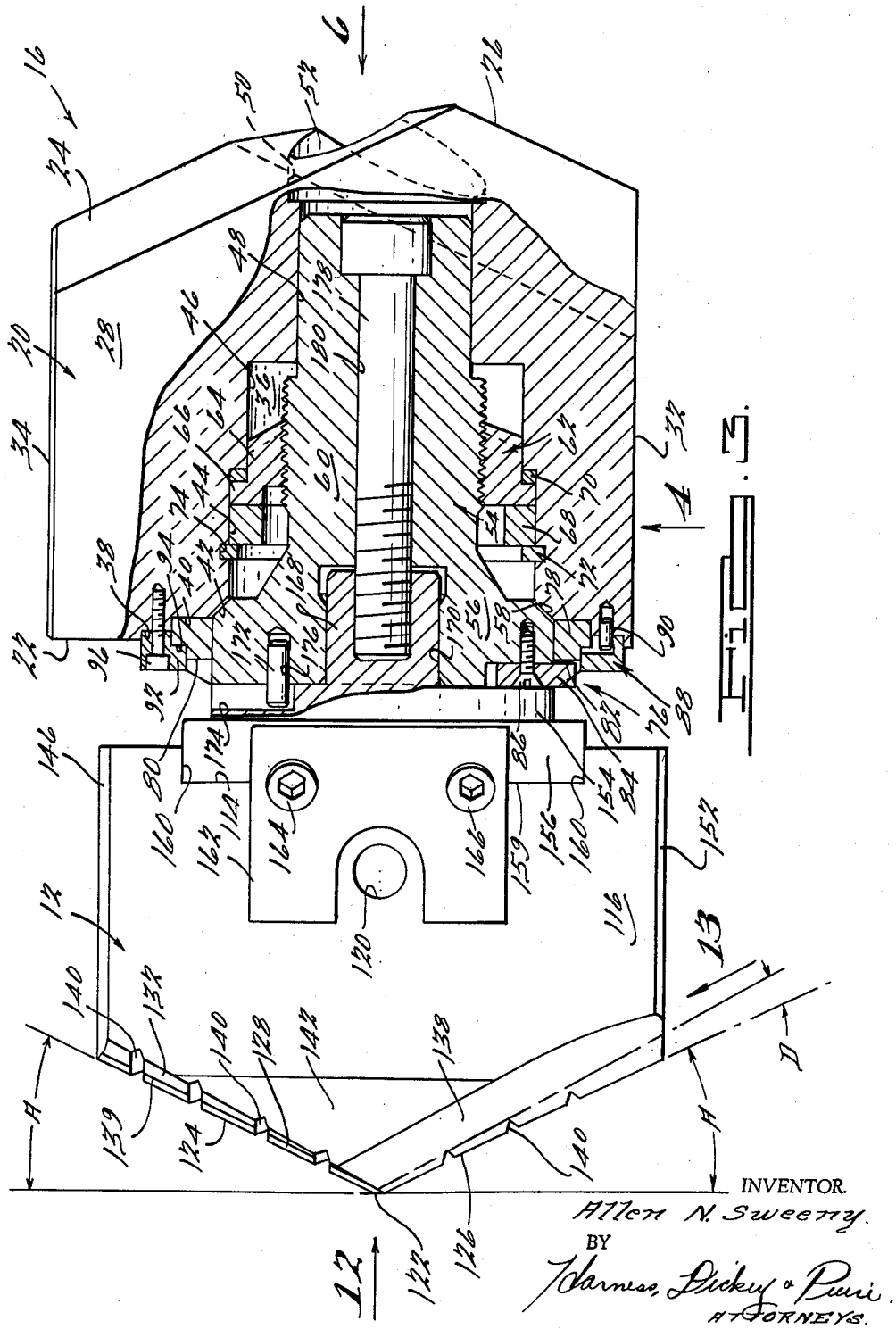

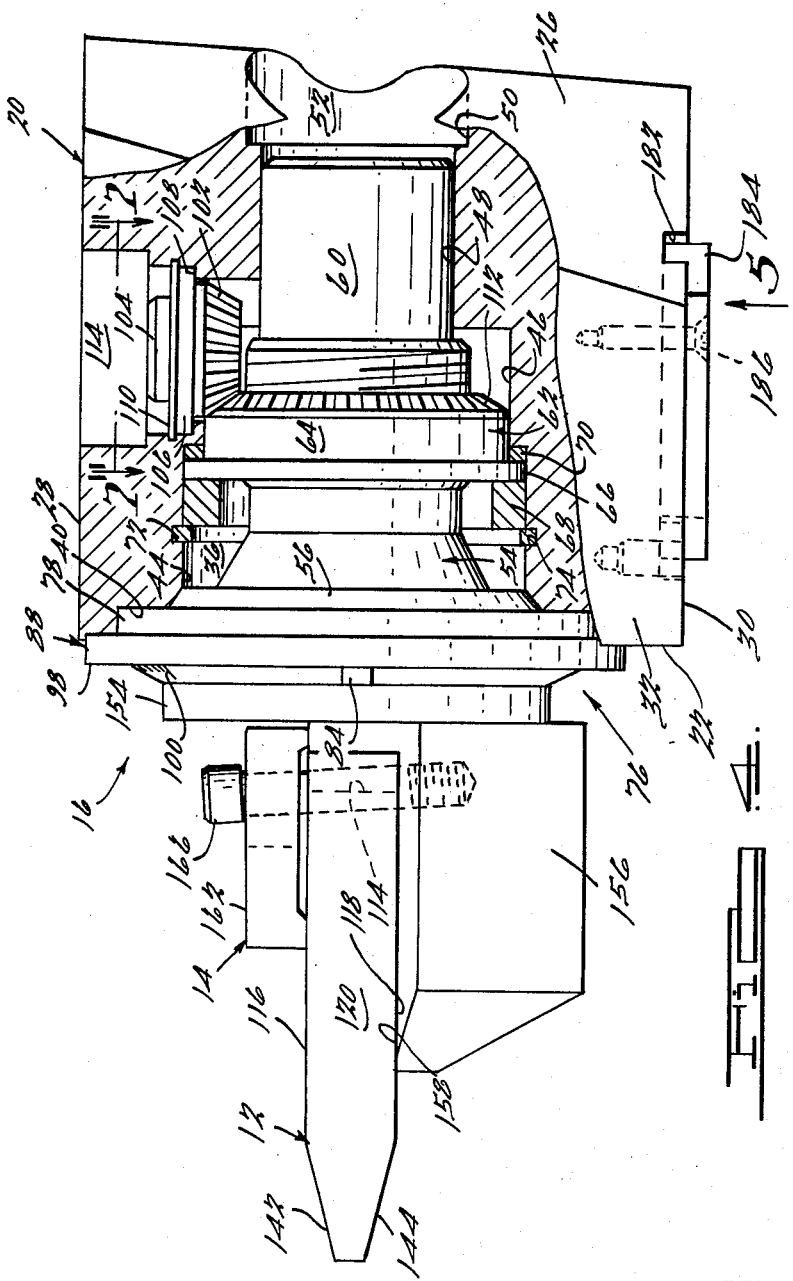

May 18, 1965 A. N. SWEENY 3,183,634
FIXTURE FOR GRINDING SPADE DRILLS OR THE LIKE
Filed May 9, 1963 5 Sheets-Sheet 4
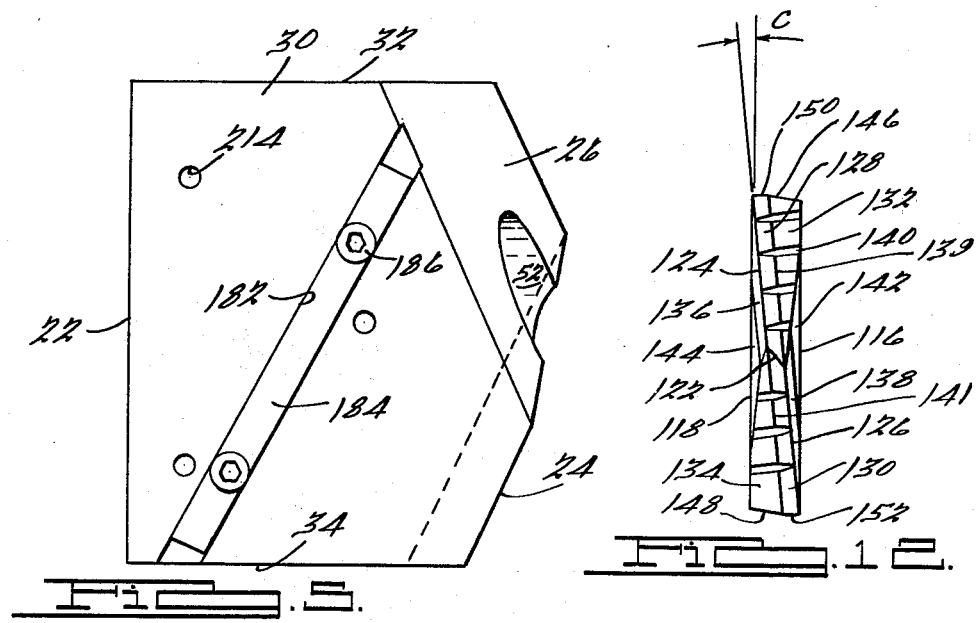
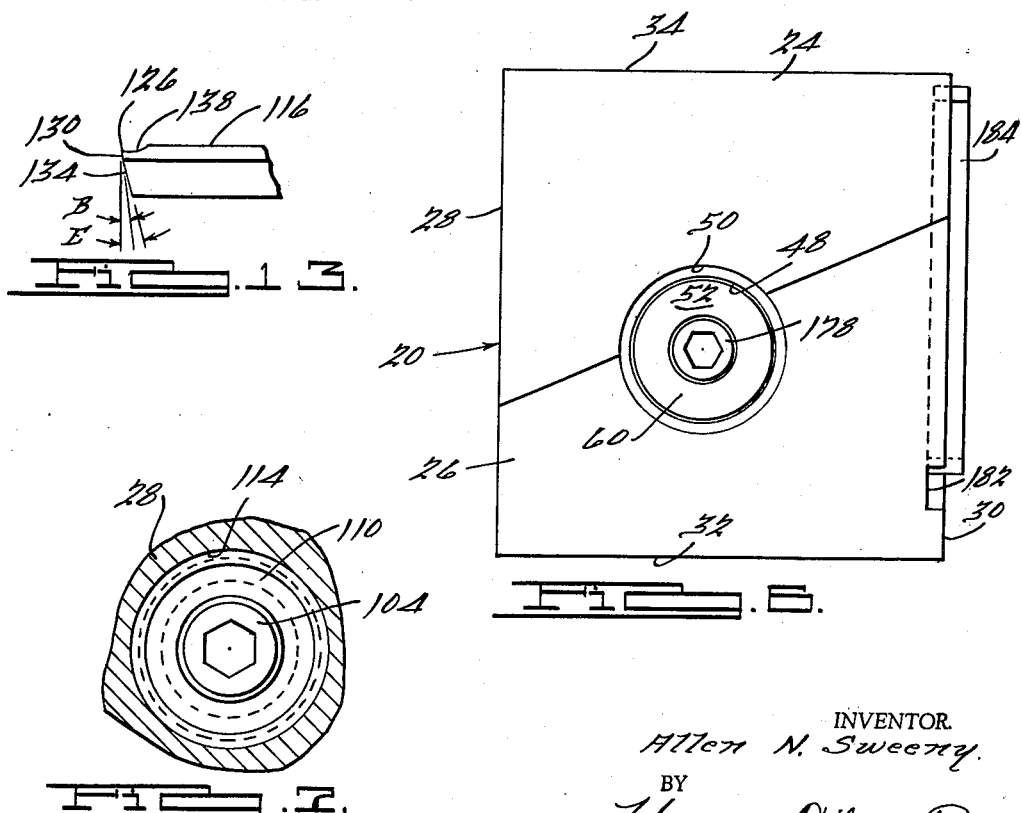
INVENTOR.
Allen N. Sweeny.
BY
Harness, Dickey & Pierce.
ATTORNEYS

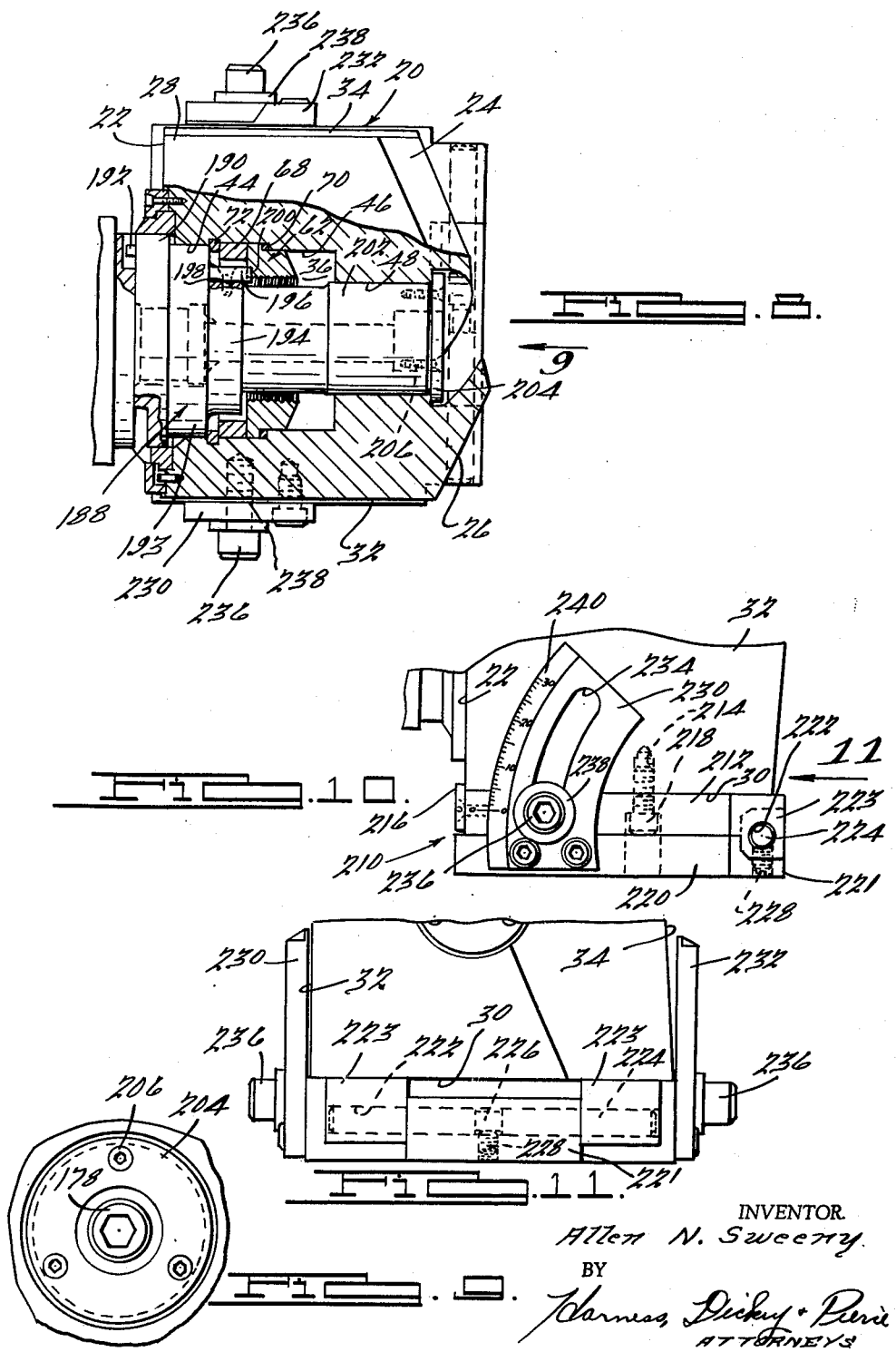

United States Patent Office 3,183,634
Patented May 18, 1965

3,183,634
FIXTURE FOR GRINDING SPADE DRILLS
OR THE LIKE
Allen N. Sweeny, Grosse Pointe, Mich., assignor to De
Vlieg Machine Company, Royal Oak, Mich., a corporation of Michigan
Filed May 9, 1963, Ser. No. 279,119
19 Claims. (Cl. 51—220)

This invention relates to grinding fixture means and more particularly to grinding fixture means for supporting a workpiece in one of a plurality of selected locations with respect to a surface grinding tool.

Certain generic classes of cutting tools may be characterized as having a plurality of surfaces which define edges for cutting material from a solid mass, surfaces for removing the cut material from the solid mass and surfaces for grinding the cutting edges relative to the solid mass. Such surfaces may be flat or curved and are often angularly offset one from the other. Certain species of such cutting tools are further characterized by the symmetry of certain of such flat and curved surfaces about the tip or point of the tool.

The surfaces on such tools often must be finished to close tolerances to assure that the tool will accurately cut material from the solid mass. It is also desirable that such surfaces be redressed to such tolerances at frequent intervals to increase the life of the tools and renew the worn edges and surfaces.

One commonplace method of finishing such tools or workpieces is grinding the surfaces by means of suitable grinding machines. Previously, it was found necessary to use different types of grinding machines in order to finish the various surfaces on such tools. For example, a surface grinding machine might be used for flat surfaces on the tool and a cylindrical grinding machine might be used for the curved surfaces. This, of course, requires much handling of the tool or workpiece and also requires different types of fixtures for holding the tool or workpiece in the machine which is used for particular grinding operations. This problem is especially pronounced in the grinding of drills of the spade type which are characterized by a plurality of pairs of surfaces which are symmetrically arranged on either side of the point of the drill. Such surfaces may be flat or curved and are often formed in planes which are tilted at compound angles with respect to standard horizontal, vertical and profile reference planes.

The primary objects of the present invention are to improve grinding fixtures for selectively locating and holding one of a plurality of surfaces on a machine tool with respect to a grinding tool in a surface grinding machine; to improve such fixtures by providing an improved tumble block which includes means for locating both flat and curved surfaces on a workpiece in working relationship with a surface grinding tool to improve such fixtures by including improved indexing means on such an improved tumble block for locating one of a pair of symmetrical surfaces on a workpiece in working relationship with a surface grinding tool and then locating the other one of the pair of symmetrical surfaces in working relationship with the same surface grinding tool without reorienting the tumble block relative to the surface grinding tool.

Further objects of the present invention are to improve tumble block fixtures for referencing surfaces on a workpiece with respect to a surface grinder by rotatably mounting means on the tumble block for supporting a workpiece in a preselected, releasably held angular relationship with respect to the tumble block; and to improve such a tumble block by providing means on said block for releasing said workpiece from its angularly held position including gear means located internally of said block which are accessible through blind hole means located in one surface of said block.

A further object of the present invention is to improve the surface grinding of convexly curved surfaces on a tool by means of a tumble block type fixture which includes means for rotating the tool relative to the surface grinder.

A still further object of the invention is to provide improved means for association with a tumble block type grinding fixture for tilting the tumble block with respect to a worktable in order to modify the geometry of the tumble block.

It is a further object of the invention to provide a tumble block particularly suited for grinding spade drills in which compound angular relationship on the spade drill may be accurately established to form the cutting edge relief angles normal to the cutting edges, to correctly orient the axis of the chip curler groove, and to locate all other critical surfaces and edges of the spade drill in a precise manner.

The nature of the invention and its objects and features will become more apparent from a consideration of the following detailed description of the invention when read with reference to the accompanying drawings in which:

FIGURE 1 is a view in perspective of a surface grinding setup which includes a grinding fixture, constructed in accordance with certain of the principles of the present invention;

FIGURE 2 is a view in top elevation of the grinding fixture illustrated in FIGURE 1 with the workpiece and the workpiece holder removed;

FIGURE 3 is an enlarged view in vertical section taken substantially along the line 3—3 of FIGURE 1;

FIGURE 4 is a view in elevation with parts broken away of the structure of FIGURE 3 and looking in the direction of the arrow 4 of FIGURE 3;

FIGURE 5 is a view in elevation looking in the direction of the arrow 5 in FIGURE 4;

FIGURE 6 is a view in elevation looking in the direction of the arrow 6 in FIGURE 3;

FIGURE 7 is a view in horizontal section taken along the line 7—7 of FIGURE 4;

FIGURE 8 is a view similar to FIGURE 3 illustrating a grinding fixture including a rotary grinding adapter;

FIGURE 9 is a view in elevation of a portion of the fixture illustrated in FIGURE 8 looking in the direction of the arrow 9 of FIGURE 8;

FIGURE 10 is a view in side elevation of a wedge angle accessory on the fixture illustrated in FIGURE 8;

FIGURE 11 is a view in elevation looking in the direction of arrow 11 of FIGURE 10;

FIGURE 12 is a view in elevation looking in the direction of the arrow 12 of FIGURE 3; and FIGURE 13 is a view in elevation looking in the direction of the arrow 13 of FIGURE 3.

Referring now to the drawings, FIGURE 1 shows a grinding machine set up including a work surface, representatively illustrated as a conventional magnetic chuck 10, which supports a spade drill 12 held by means of a workholder 14 on an improved grinding fixture 16 with respect to a surface grinding machine 18 which is representatively illustrated as having a surface grinding wheel 19 for finishing the surfaces of the drill 12. The magnetic chuck 10 is supported in a conventional fashion for movement longitudinally or transversely of the grinding wheel 19. Furthermore, the grinding wheel 19 may be moved with respect to the magnetic chuck 10 in a conventional fashion.

The improved grinding fixture 16 comprises a block 20 which in the illustrated embodiment is characterized as a prismatoid having seven exterior surfaces; more specifically, the block has a front surface 22 which is located opposite to a pair of obliquely related rear surfaces 24, 26 disposed in planes intersecting the plane of the surface 22.

The block 20 further includes a pair of opposite parallel surfaces 28, 30 which are contiguous and perpendicular to the front surface 22. A surface 32 of the block 20 is located in a plane which is perpendicular to the planes of the parallel surfaces 28, 30 and a block surface 34 is located on the side of the block opposite to the surface 32.

The block 20 has a bore 36 extending therethrough from the front surface 22 and formed by a plurality of offset internal surfaces which are concentrically arranged and of varying diameter. More specifically, these internal surfaces, starting from the front surface 22 of the block 20 include a counterbore 38 which communicates with a second recessed surface 40 of a smaller diameter which intersects a sloping surface 42 in turn communicating with a cylindrical surface 44, a cylindrical surface 46 of a smaller diameter, a cylindrical surface 48 of a still smaller diameter, and a cylindrical surface 50 which is of a diameter intermediate that of cylindrical surfaces 46 and 48. The surface 50 forms an opening 52 which intersects the sloping surfaces 24, 26.

The fixture 16 further includes an insert 54 with a cylindrical head portion 56 which has a conical surface 58 supported by the conical surface 42 of the block 20. The insert 54 has an elongated axially directed hub portion 60 which is of a smaller diameter than the head portion 56, is located centrally thereof and extends toward the sloping surfaces 24, 26 of the block 20. The end of the hub portion 60 is supported by the cylindrical surface 48 formed in the block 20. The surfaces 42 and 48 in the block 20 locate the insert 54 centrally of the passageway 36 and support the insert 54 for rotation about the longitudinal axis thereof for reasons to be discussed.

The surface of the elongated hub portion 60 is spaced from the cylindrical surfaces 44, 46 formed in the block 20 and is externally threaded intermediate the head 56 and the end thereof to threadably engage an internally threaded nut 62 having a cylindrical body portion 64 which engages the surface 46 and a head portion 66 of a greater diameter than the cylindrical body portion 64. The nut 62 has a pair of shims 68, 70 located on either side of and in axial abutment with the head portion 66. The shims and nut are held against axial movement with respect to the shoulder formed by the cylindrical surfaces 44, 46 by means of a snap ring 72 which inserts in a groove 74 formed in the cylindrical surface 44.

The fixture 16 further includes a dial clamp arrangement 76 which comprises a ring 78 seated against the recessed surface 40. This ring has a pair of diametrically opposed notches 80, 82 formed therein one of which receives a key 84 secured to the head 56 of the insert 54 by suitable fastening means such as a screw 86. In FIGURE 3 the key 84 is shown as being inserted in the aperture 82.

A clamp ring 88 which is received in the counterbore 38 in the block 20 is held against rotation with respect to the block 20 by means of a dowel pin 90 which has the opposite ends thereof directed into openings formed in the ring 88 and the block 20 respectively. The ring 88 has a radially inwardly directed lip 92 which is clamped against a notched surface 94 in the ring 78 by suitable fastening means such as screws 96 directed through the ring 88 into threaded engagement with the block 20 for preventing rotation of the ring 78 relative to the block 20. It can be seen that the clamped ring 78 will, in turn, prevent the insert 54 from rotating relative to the block 20 so long as the key 84 is located in one of the opposed notches 80, 82.

The clamp ring 88 is centered by the counterbore 38 so that a vernier scale 98 thereon has its zero reference located in a plane perpendicular to the longitudinal axis of the bore 36 and perpendicular to surfaces 28, 30. The vernier scale 98 thereby serves as a reference for a protractor scale 100 on the ring 78 to indicate the angular relationship between the ring 78 and the ring 88 for reasons to be discussed.

The fixture 16 further includes means, best shown in FIGURE 4, for releasing the insert 54 from the ring 78. Such means comprises a pinion gear 102 which has a socket head 104 and a shoulder portion 106 which is held against a recessed surface 108 in the block 20 by means of a snap ring 110. The teeth on the pinion gear 102 engage bevel gear teeth 112 formed on one surface of the nut 62. A lateral bore 114 in the surface 28 of the tumble block 20 makes the pinion gear 102 accessible from the exterior of the block so that a suitable tool can be inserted in the socket head 104 thereof for rotating it in a predetermined direction to cause the nut 62 to thread the insert 54 axially of the tumble block 20 until the key 84 is moved out of the aperture 82 in the ring 78.

The above described embodiment of the grinding fixture of the present invention is especially suited for duplicating the geometry of a workpiece of the spade drill type in order to locate the surfaces thereon in working relationship with a surface grinder. In order to fully appreciate the advantages of the present invention, it is necessary to elaborate on the details of the geometry of such spade drills.

Such details are best shown in FIGURES 3, 4, and 12, 13 which show the spade drill 12 as comprising a recessed base 114 and a pair of flat sides 116, 118 which are in spaced parallelism.

The geometry of the head of the drill is symmetrically arranged about a drill point 122 and includes cutting edges 124, 126 sloping on either side thereof to define drill point angles A (FIG. 3) which are inclined a predetermined number of degrees from a plane perpendicular to the axis of the drill. The head of the drill further comprises the following surfaces adjacent the cutting edge 124 and 126: diametrically opposed primary relief surfaces 128, 130; diametrically opposed secondary relief surfaces 132, 134; diametrically opposed chip-curling surfaces 136, 138; and a plurality of chip-breaking grooves 140.

More particularly, the cutting edges 124, 126 are defined, respectively, by the intersection of one of the primary relief surfaces 128 with the chip-curling surface 136 and the intersection of the other of the pair of primary relief surfaces 130 with the chip-curling surface 138. Each of the primary relief surfaces 128, 130 has a predetermined inclination B (FIG. 13), relative to a reference plane which includes the adjacent cutting edge 124 or 126 and is perpendicular to the surfaces 116 and 118.

The primary relief surfaces are of a uniform width, extending from the cutting edges 124, 126 to edges 139, 141 which is defined by the juncture between the primary relief surfaces 128, 130 and their adjacent secondary relief surfaces 132, 134. The edges 139, 141 are inclined with respect to the drill sides 118, 116, respectively and the angle of this inclination is shown as angle C in FIG. 12. For a drill of a given thickness, diameter and wedge angle (which will be hereinafter defined) there is only one angle C which will produce a primary relief surface of constant width. It is highly desirable to maintain such a constant width to produce a spade drill of maximum strength. Accordingly a chart may be supplied to users of the device of the present invention indicating the proper angle C necessary to produce constant width primary relief surfaces on drills of varying dimensions and configurations. This angle must be computed for the various drills to be ground and the primary relief surfaces 128, 130 are offset at a compound angle with respect to the flat side surfaces 116, 118 of the drill.

The bottoms of center lines of the chip-curling surfaces 136, 138, preferably are angularly offset from the cutting edges 124, 126 by an angle D, as best shown in FIGURE 3, and are also formed on a predetermined radius. The depth of the chip-curling surfaces also varies from a maximum at the outer diameter of the drill to zero at the drill point 122.

The secondary relief surfaces 132, 134 are contiguous to the primary relief surfaces 128, 130, respectively, along the edges 139, 141 and, as illustrated in FIGURE 13, they are disposed as an angle E with respect to a plane which includes the adjacent cutting edge 124 or 126 and which is perpendicular to the surfaces 116, 118. The angle E will be seen to be greater than the primary relief angle B. The outer peripheries of the secondary relief surfaces are defined by their intersection with the sides 116, 118 and a pair of wedge surfaces 142, 144 formed in each of the sides 116, 118 at the tip of the drill. The wedge surfaces are forwardly convergingly inclined and the angle which they define with a plane including the sides 116 and 118 may be termed the "wedge angle."

The chip-breaking grooves 140 are formed in the primary and secondary relief surfaces and are preferably perpendicular to the edges 124, 126 as well as being parallel to the angle of inclination of the secondary relief surfaces 132, 134. The drill is guided by means of circular lands 150, 152 on the outer diameter of the spade drill 12. These have diameter relief surfaces 146 and 148.

In the illustrated arrangement, the drill 12 is supported on the fixture 16 by the workholder 14 which is representatively illustrated as comprising a base 154 having a head portion 156 directed outwardly thereof and providing surfaces 158 and 159 for supporting and locating the spade drill 12 in two directions. The drill 12 is clamped on the workholder 14 by means of a generally U-shaped bracket 162. The drill is located with its point 122 disposed on the axis of rotation of the workholder by the interfitting of the head portion 156 in the recess of the drill base 114. Opposite sides of the head portion 156 abut against opposite shoulders 160 formed by the recessed configuration of the drill base 114. This assures that the surfaces and edges ground on opposite sides of the drill will be symmetrically located about its central axis. The bracket 162 is held against the face 116 of the drill 12 by suitable fastening means which are representatively illustrated as being laterally spaced screws 164, 166 extending through the bracket 162 into threaded engagement with the head portion 156. The workholder 14 further includes an internally threaded hub portion 168 which is located centrally of the base 154 and directly outwardly thereof away from the head portion 156.

The hub 168 locates the workholder 14 with respect to the insert 54 by its reception in an opening 170 formed in the cylindrical head 56 thereof. The workholder 14 is held against rotation with respect to the insert 54 by means of a dowel pin 172 which has its one end directed into a radially outwardly extending opening 174 in the base 154 of the workholder and the opposite end directed into an opening 176 in the head 56. The workholder 14 is also held against axial movement with respect to the insert 54 by means of an elongated socket headed screw 178 which is directed through an opening 180 extending longitudinally of the elongated axially directed hub portion 60. The screw 178 threads into the hub 168 to hold the base 154 in engagement with the head 56 of the insert.

For finishing the primary relief surfaces 128, 130, the tumble block 20 is tipped so that the surface 24 rests on the top surface of the magnetic chuck 10. The surface 24 is so inclined with respect to the axis of the workholder 14 as to establish the angles A and B. In order to properly position the drill 12 with respect to the tumble block 20 so that the primary relief surfaces 128, 130 are ground to a constant width it is necessary to properly fix the angular position of the spade drill. This is accomplished by loosening the screws 96 which clamp the ring 88 against the ring 78 and rotating the ring 78 until the protractor and vernier scales 98, 100 are set at an angle equal to angle C in FIGURE 12. The screws 96 are then tightened to accurately locate the notches 80, 82 in the ring 7 with respect to the tumble block 20. When this angular adjustment has been made and the key is in the notch 82, the primary relief surface 130 is ready for finishing. This is accomplished in a conventional manner by moving the magnetic chuck 10 (which is energized in a conventional fashion) relative to the grinding machine 18.

In order to properly position the other primary relief surface 128 with respect to the grinding machine 18, the pinion gear 102 is rotated to cause the insert 54 to be moved axially of the block 20 until the key 84 thereon is located outside the notch 82 in the ring 78. The insert 54 and workholder 14 are then rotated about their longitudinal axes until the key 84 is aligned with the index notch 80 which is diametrically opposed to the notch 82. The pinion gear 102 is then rotated in an opposite direction to move the insert 54 toward the block 20 until the key 84 is inserted in the notch 80. This will properly position the other of the primary relief surfaces 128 with respect to the surface grinding wheel 19 without having to reorient the tumble block 20. It thereby assures that this primary relief surface 128 will be ground identically to the primary relief surface 130. The indexing action of the diametrically opposed notches 80, 82 also assures that the drill point 122 will be properly positioned on the drill 12.

The secondary relief surfaces 132, 134 on the drill 12 are ground by de-energizing the magnetic chuck 10 so that the block 20 can be tumbled to locate the surface 26 on the chuck. The setting on the vernier and protractor ring left is the same position as was used in grinding the primary relief surfaces. The first one of such surfaces and then the other is uniformly ground to a desired tolerance by indexing the respective surfaces relative to the ring 78 as discussed above in the grinding of the primary relief surfaces.

The chip-breaker grooves 140 are ground parallel to the secondary relief angle E by means of a grinding wheel which is formed to have a grinding surface possessing a shape corresponding to that of the grooves. Since the grooves 140 are parallel to the secondary relief angle, they can be finished with the tumble block 20 located on the surface 26 and arranging the cutting line of the grinding tool perpendicular to the cutting edges 124, 126 of the drill. The notches 80, 82 allow chip-breaking grooves 140 on both the drill point angles to be ground from the same setup by indexing the drill 12 with respect thereto as previously discussed.

The chip-curling surfaces 136, 138 are ground with a formed wheel which finishes the curling surfaces to a predetermined radius while the tumble block 20 is positioned on the surface 30 which has a keyway 182 and a key 184 connected therein by suitable fastening means such as screws 186. The key 184 will abut against the edge of the magnetic chuck 10 and is disposed at the proper angle to cause the center lines of the chip-curling surfaces 136, 138 to define the angle D with the adjacent cutting edges 124, 126. The rings 78 and 88 are also angularly adjusted to position the drill to establish the desired depth of the chip-curling groove at the outer diameter of the drill. Both chip-curling surfaces are ground with one setting of the block 20 by indexing the drill 180° in the manner previously described.

The diameter relief surfaces 146, 148 on the drill diameter are ground by locating the tumble block 20 on the surface 34 and setting the protractor and vernier scales 100, 98 at the desired relief angle. The surface 34 possesses a slight angular relation to the axis of rotation of the workholder 14 to produce what is termed "back taper." For example, a back taper of .005" per linear inch has been used. The taper is in a radially inwardly and rearwardly extending direction and it serves to prevent the drill from binding during use. The indexing arrangement again allows both edges of the drill to be uniformly ground in the same setup.

In order to grind the circular land portions 150, 152 on the outer diameter of the spade drill, the insert 54 is removed from the tumble block 20 and a rotary grinding accessory or adaptor 188 (FIGS. 8 and 9) is inserted into the passageway 36 therein. This adaptor has a large diameter head portion 190 on which the workholder 14 is held against rotation by means of a dowel pin 192. A smaller diameter portion 193 is directed rearwardly of the head 190 where its outer surface engages the cylindrical surface 44 of the tumble block 20. A still smaller diameter portion 194 is directed rearwardly from the portion 193 in spaced relationship with surface 44. A key 196 is fastened to the portion 194 by suitable fastening means such as a screw 198. This key inserts into a keyway 200 formed in the head 66 of the nut 62.

The adaptor 188 further includes a pilot shaft portion 202 which projects rearwardly from the portion 194 into the cylindrical surface 48. The end of the small diameter portion 202 has a plate 204 fastened thereto by suitable fastening means such as screws 206 which seats against the block 20 at the hole 52 to prevent movement of the adaptor 188 in the direction of surface 22 of the block 20. The small diameter hub portion 202 of the adaptor 188 is spaced from the internal threads of nut 62. Accordingly, when the pinion gear 102 is moved, the nut 62 will cause the adaptor 188 to rotate about its axis and thereby cause the workholder 14 to rotate about its axis. This causes the circular land portions 150, 152 on the diameter of the spade drill 12 to be moved tangent to the grinding wheel 19. The adaptor 188 can be readily rotated with respect to the grinding wheel 19 with a simple movement of a hex wrench or the like, inserted in the pinion gear 102. As in the grinding of the surfaces 146, 148 the inclination of the surface 34 produces a back taper on the circular land portions.

The wedge surfaces 142, 144 are ground by the use of a protractor plate 210 attachment to the block 20 which is best illustrated in FIGURES 10 and 11 as comprising a top plate 212 located with respect to a plurality of threaded holes 214 in the block surface 30 by means of a locating plate 216 which is connected by suitable fastening means transversely of one of the surfaces of the plate 212. The locating plate 216 abuts against the surface 22 of the block 20 so that alignment of the sides of the top plate 212 will cause the holes 214 to be aligned with the plate 212 so that it can be fastened by suitable means such as screws 218 to the block 20. The protractor plate 210 further comprises a bottom plate 220 which has an offset portion 221 on one end thereof which inserts into offset portions 223 on the plate 212. The offset portions 221, 223 have an aperture 222 directed therethrough which receives a pin 224 having a small diameter portion 226 intermediate the ends thereof against which a set screw 228 is threaded for holding the pin 224 within the aperture 222. The block 20 can thereby be pivoted about the pin 224 which in effect hinges the plates 212, 220 together for such pivotal movement.

The plate 220 has adjusting arms 230, 232 connected on either side thereof each of which includes a curved aperture 234 therein which receives a socket headed screw 236 having one end thereof threaded into the top plate 212 and the opposite end thereof in engagement with a washer 238 which engages the outer face of the adjusting arm and is held thereagainst when the screw 236 is threaded into the top plate 212.

One of the adjusting arms 230, 232 may include an angular scale 240 which is referenced with respect to the top plate 212 to indicate the angle between the block 20 and the bottom plate 220.

When the block 20 has been pivoted about the hinged ends of the plates 212, 220 so that one of the wedge surfaces 142, 144 is located in a plane tangent to the grinding wheel 19, the screw 236 is threaded into the top plate 212 to hold the top plate with respect to the bottom plate 220 to thereby hold one of the wedge surfaces 142, 144 in such a relationship with the surface grinding wheel 19. The other of the wedge surfaces can be located in such a tangent plane merely by indexing the spade drill 12 and workholder 14 with respect to the block 20 in the manner previously discussed.

It is to be noted that in the absence of the rotary workholder 14, the primary relief surfaces 128 and 130 would vary in width from zero at the center of the drill to a maximum dimension at the outside diameter of the drill. While the angular relationship of the block surface 24 to the workholder 14 is effective to control the cutting edge angle A and the primary relief angle B, the ability afforded to angularly position the drill about the axis of the workholder permits control of the width of the primary relief angle.

It will also be seen that the rotary adjustment feature of the device of the present invention affords the ability to control the depth of the chip-curling grooves 136, 138. This is effected through the selection of the angle which the bottom of said groove makes with a plane including either of the side walls 116 or 118. Furthermore, the angular setting of the workholder assures that the chipbreaker grooves 140 are perpendicular to the adjacent cutting edge. Of course, this adjustment also permits individual selection of the relief angle for the drill diameter relief surfaces 146 and 148.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A grinding fixture for duplicating the geometry of a spade drill so that surfaces thereon can be ground by using a plain surface grinder for all grinding operations comprising a tumble block having a plurality of surfaces, means supported by said block for pivoting the drill relative thereto, means for locating the drill in a predetermined angular relationship with said block in which one of the surfaces on the drill is parallel to one of said surfaces on said block including means for indexing the drill a predetermined angle relative to said block in which another of the surfaces on the drill is parallel to said one of said surfaces on said block, and means for releasably holding the drill against movement relative to said block when the drill is located in said predetermined angular relationship with said block.

2. A grinding fixture for duplicating the geometry of a spade drill so that surfaces thereon can be ground by using a plain surface grinder for all grinding operations comprising a tumble block having a plurality of surfaces including only one pair of parallel surfaces, means supported by said block for pivoting the drill relative thereto, means for locating the drill in a predetermined angular relationship with said block in which one of the surfaces on the drill is parallel to one of said surfaces on said block other than said pair of parallel surfaces including means for indexing the drill a predetermined angle relative to said block in which another of the surfaces on the drill is parallel to said one of said surfaces on said block, and means for releasably holding the drill against movement relative to said block when the drill is located in said predetermined angular relationship with said block.

3. A grinding fixture for duplicating the geometry of a spade drill so that surfaces thereon can be ground by using a plain surface grinder for all grinding operations comprising a tumble block having a plurality of surfaces only one of which is rectangular in form, means supported by said block for pivoting the drill relative thereto, means for locating the drill in a predetermined angular relationship with said block in which one of the surfaces on the drill is parallel to one of said surfaces on said block including means for indexing the drill a predetermined angle relative to said block in which another of the surfaces on the drill is parallel to said one of said surfaces on said block, and means for releasably holding the drill against movement relative to said block when the drill is located in said predetermined angular relationship with said block.

4. A grinding fixture for duplicating the geometry of a spade drill so that surfaces thereon can be ground by using a plain surface grinder for all grinding operations comprising a tumble block having a first surface and a pair of intersecting surfaces opposite to said first surface which are located in planes which intersect the plane of said first surface, means supported by said block for pivoting the drill relative thereto, means for locating the drill in a predetermined angular relationship with said block in which one of the surfaces on the drill is parallel to one of said pair of intersecting surfaces including means for indexing the drill a predetermined angle relative to said block in which another of the surfaces on the drill is parallel to said one of said pair of intersecting surfaces, and means for releasably holding the drill against movement relative to the block when the drill is located in said predetermined angular relationship with said block.

5. A grinding fixture for duplicating the geometry of a spade drill so that a plurality of surfaces including a pair of symmetrical surfaces thereon can be ground by using a plain surface grinder for all grinding operations comprising a tumble block having a plurality of surfaces, means supported by said block for pivoting the drill relative thereto, means for locating the drill in a predetermined angular relationship with said block in which a surface on the drill is parallel to one of said surfaces on said block, said locating means including indexing means for locating one of the pair of symmetrical surfaces on the drill in said predetermined angular relationship and for locating the other of the pair of symmetrical surfaces on the drill in said predetermined angular relationship while maintaining the same orientation of the block with respect to the surface grinder, and means for releasably holding the drill against movement relative to said block when the drill is located in said predetermined angular relationship with said block.

6. A grinding fixture for duplicating the geometry of a spade drill so that a plurality of surfaces including a pair of symmetrical surfaces thereon can be ground by using a plain surface grinder for all grinding operations comprising a tumble block having a plurality of surfaces including only one pair of parallel surfaces, means supported by said block for pivoting the drill relative thereto, means for locating the drill in a predetermined angular relationship with said block in which a surface on the drill is parallel to one of said surfaces on said block other than said pair of parallel surfaces, said locating means including indexing means for locating one of the pair of symmetrical surfaces on the drill in said predetermined angular relationship and for locating the other of the pair of symmetrical surfaces on the drill in said predetermined angular relationship while maintaining the same orientation of the block with respect to the surface grinder, and means for releasably holding the drill against movement relative to said block when the drill is located in said predetermined angular relationship with said block.

7. A grinding fixture for duplicating the geometry of a spade drill so that a plurality of surfaces including a pair of symmetrical surfaces thereon can be ground by using a plain surface grinder for all grinding operations comprising a tumble block having a first surface and a pair of intersecting surfaces opposite to said first surface which are located in planes which intersect the plane of said first surface, means supported by said block for pivoting the drill relative thereto, means for locating the drill in a predetermined angular relationship with said block in which a surface on the drill is parallel to one of said pair of intersecting surfaces, said locating means including indexing means for locating one of the pair of symmetrical surfaces on the drill in said predetermined angular relationship and for locating the other of the pair of symmetrical surfaces on the drill in said predetermined angular relationship while maintaining the same orientation of the block with respect to the surface grinder, and means for releasably holding the drill against movement relative to said block when the drill is located in said predetermined angular relationship with said block.

8. A grinding fixture for duplicating the geometry of a spade drill so that a plurality of surfaces including a pair of symmetrical surfaces thereon can be ground by using a plane surface grinder for all grinding operations comprising a tumble block having a plurality of surfaces, means supported by said block for pivoting the drill relative thereto, means for locating the drill in a predetermined angular relationship with said block in which a surface on the drill is parallel to one of said surfaces on said block, said locating means including indexing means for locating one of the pair of symmetrical surfaces on the drill in said predetermined angular relationship and for locating the other of the pair of symmetrical surfaces on the drill in said predetermined angular relationship while maintaining the same orientation of the block with respect to the surface grinder, and means including gear means located internally of said block for releasably holding the drill against movement relative to said block when the drill is located in said predetermined angular relationship with said block.

9. A grinding fixture for duplicating the geometry of a spade drill so that surfaces thereon can be ground by using a plane surface grinder for all grinding operations comprising a tumble block having a plurality of surfaces, means defining a passageway in said block, an insert element supported within said passageway for rotating the drill relative to said block, means for locating the drill in a predetermined angular relationship with said block in which a surface on the drill is parallel to one of said surfaces on said block, said locating means including indexing means for locating one of a pair of symmetrical surfaces on the drill in said predetermined angular relationship and for locating the other of the pair of symmetrical surfaces on the drill in said predetermined angular relationship without reorienting the block with respect to the surface grinder, and means for releasably holding the drill against movement relative to said block when the drill is located in said predetermined angular relationship with said block including a first gear having means thereon in threaded engagement with said insert element, means for preventing movement of said first gear axially of said passageway, and a second gear for rotating said first gear in a direction to thread said insert element outwardly of said passageway.

10. A grinding fixture for duplicating the geometry of a spade drill so that a plurality of surfaces thereon can be ground by using a plain surface grinder for all grinding operations comprising a tumble block having a plurality of surfaces, means defining a passageway in said block, an insert element supported within said passageway for rotating the drill relative to said block, means for locating the drill in a predetermined angular relationship with said block in which a surface on the drill is parallel to one of said surfaces on said block including means for indexing the drill a predetermined angle relative to said block in which another of the surfaces on the drill is parallel to said one of said surfaces on said block, and means for releasably holding the drill against movement relative to said block when the drill is located in said predetermined angular relationship with said block.

11. A grinding fixture for duplicating the geometry of a spade drill so that surfaces thereon can be ground by using a plain surface grinder for all grinding operations comprising a tumble block having a plurality of surfaces, means supported by said block for rotating the drill relative thereto, means for locating the drill in a predetermined angular relationship with said block in which a surface on the drill is parallel to one of said surfaces on said block including means for indexing the drill a predetermined angle relative to said block in which another of the surfaces on the drill is parallel to said one of said surfaces on said block, and means including gear means located internally of said block for releasably holding the drill against movement relative to said block when the drill is located in said predetermined angular relationship with said block.

12. A grinding fixture for duplicating the geometry of a spade drill so that surfaces thereon can be ground by using a plain surface grinder for all grinding operations comprising a tumble block having a plurality of surfaces, means defining a passageway in said block, an insert element supported within said passageway for rotating the drill relative to said block, means for locating the drill in a predetermned angular relationship with said block in which a surface on the drill is parallel to one of said surfaces on said block including means for indexing the drill a predetermined angle relative to said block in which another of the surfaces on the drill is parallel to said one of said surfaces on said block, and means including gear means located internally of said block for releasably holding said insert element against movement relative to said block when the drill is located in said predetermined angular relationship with said block.

13. A grinding fixture for duplicating the geometry of a spade drill so that surfaces thereon can be ground by using a plain surface grinder for all grinding operations comprising a tumble block having a plurality of surfaces, means defining a passageway in said block, an insert element supported within said passageway for rotating the drill relative to said block, a first gear having means thereon in threaded engagement with said insert element, means for preventing movement of said first gear axially of said passageway, and a second gear for rotating said first gear in a direction to thread said insert element outwardly of said passageway.

14. A grinding fixture for duplicating the geometry of a spade drill so that surfaces thereon can be ground by using a plain surface grinder for all grinding operations comprising a tumble block having a plurality of surfaces, means defining a passageway in said block, an insert element supported within said passageway for rotating the drill relative to said block, a first gear located within said passageway having means thereon in threaded engagement with said insert element, means for preventing movement of said first gear axially of said passageway, a second gear mounted within said block in operative engagement with said first gear for rotating said first gear in a direction to thread said insert element outwardly of said passageway, and means defining a blind hole in said block for providing accessibility to said second gear from the exterior of said block.

15. A grinding fixture for duplicating the geometry of a spade drill so that surfaces thereon can be ground by using a plain surface grinder for all grinding operations comprising a tumble block having a plurality of surfaces, means supported by said block for pivoting a drill relative thereto, a first ring supported on one of said surfaces of said block having a vernier scale thereon, a second ring mounted concentrically with said first ring having a protractor scale thereon, means for fixedly holding said first ring on said one surface and for clamping said second ring against said one surface when a predetermined angle is set between said protractor scale and said vernier scale, coacting means on said second ring and said means for rotating the drill for locating the drill at said perdetermined angle in order to locate a surface thereon parallel to another of said surfaces on said block, and means for releasably holding the drill against movement relative to said block when the drill is located at said predetermined angle.

16. A grinding fixture for duplicating the geometry of a spade drill so that surfaces thereon can be ground by using a plain surface grinder for all grinding operations comprising a tumble block having a plurality of surfaces, means defining a passageway in said block, an insert element supported within said passageway for rotating the drill relative to said block, a first ring supported on one of said surfaces on said block having a vernier scale thereon, a second ring mounted concentrically with said first ring having a protractor scale thereon, means for fixedly holding said first ring on said one surface and for clamping said second ring against said one surface when a predetermined angle is set between said protractor scale and said vernier scale, coacting means on said second ring and said insert element for locating the drill at said predetermined angle in order to locate a surface thereon parallel to one of said surfaces on said block, and means for releasably holding the drill against movement relative to said block when the drill is located at said predetermined angle.

17. A grinding fixture for duplicating the geometry of a spade drill so that surfaces thereon can be ground by using a plain surface grinder for all grinding operations comprising a tumble block having a plurality of surfaces, means defining a passageway in said block, an insert element supported within said passageway for rotating the drill relative to said block, a first ring supported on one of said surfaces on said block having a vernier scale thereon, a second ring mounted concentrically with said first ring having a protractor scale thereon, means for fixedly holding said first ring on said one surface and for clamping said second ring against said one surface when a predetermined angle is set between said protractor scale and said vernier scale, coacting means on said second ring and said insert element for locating the drill at said predetermined angle in order to locate a surface thereon parallel to one of said surfaces on said block, and means including gear means located internally of said block for releasably holding said insert element against movement relative to said block when the drill is located at said predetermined angle.

18. A grinding fixture for duplicating the geometry of a spade drill so that a plurality of surfaces including a pair of symmetrical surfaces thereon can be ground by using a plain surface grinder for all grinding operations comprising a tumble block having a plurality of surfaces, means defining a passageway in said block, an insert element supported within said passageway, said insert element including means for indexing the drill from a first position wherein one of the pair of symmetrical surfaces of the drill is parallel to one of said surfaces on said block to a second position wherein the other of the pair of symmetrical surfaces is parallel to said one of the said surfaces, coacting means on said insert element and said block for holding said insert element against axial movement, first gear means, second gear means in operative engagement with said first gear means for rotating said first gear means, and coacting means on said insert element and said first gear means for rotating said insert element relative to said block as said second gear means rotates said first gear means.

19. A grinding fixture for duplicating the geometry of a spade drill so that surfaces thereon can be ground by using a plain surface grinder for all grinding operations comprising a tumble block having a plurality of surfaces, means on said block for locating the drill in a predetermined angular relationship with said block in which a surface on the drill is parallel to one of said surfaces on said block,, and means on one of said surfaces on said block for tilting said block relative to the surface grinder including a first plate connected to said one surface, a second plate pivotally connected to said first plate, and means for holding said first and second plates in a predetermined angular relationship.

References Cited by the Examiner
UNITED STATES PATENTS

| | | | |
|---|---|---|---|
| 2,181,396 | 11/39 | Edgar. | |
| 2,385,902 | 10/45 | Wilson | 51—220 |
| 2,397,738 | 4/46 | Howe | 51—220 |
| 2,429,893 | 10/47 | Parks et al. | 51—220 |
| 2,539,289 | 1/51 | Vavrin | 51—220 |
| 2,595,093 | 4/52 | Mouw | 51—220 |
| 2,595,950 | 5/52 | Keebler | 51—220 |
| 2,600,432 | 6/52 | Sanders | 51—220 X |
| 2,873,562 | 2/59 | Stanford et al. | 51—220 |
| 3,065,580 | 11/62 | Benjamin et al. | 51—220 |

LESTER M. SWINGLE, *Primary Examiner.*
J. SPENCER OVERHOLSER, *Examiner.*